No. 744,364. PATENTED NOV. 17, 1903.
J. E. KREWSON.
DEVICE FOR CAPPING, DECAPPING, AND LOADING CARTRIDGES.
APPLICATION FILED FEB. 28, 1903.
NO MODEL.
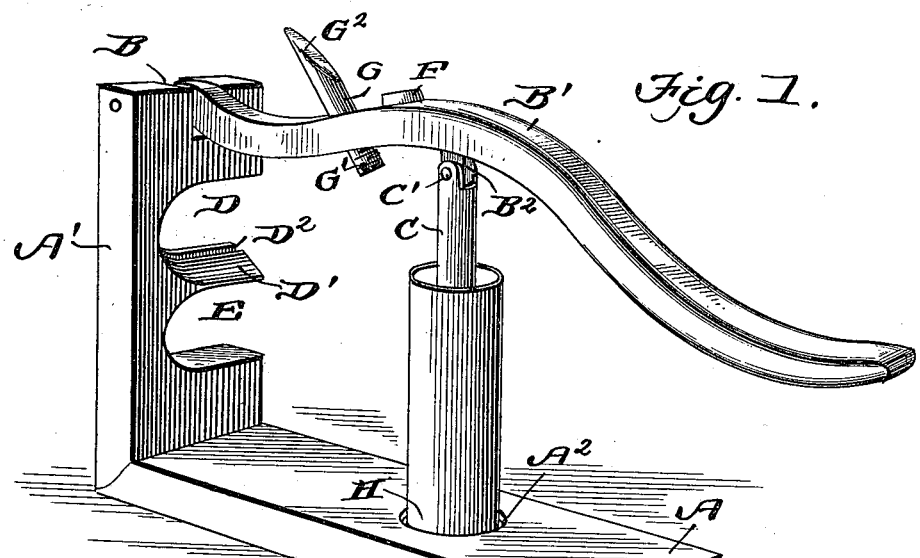
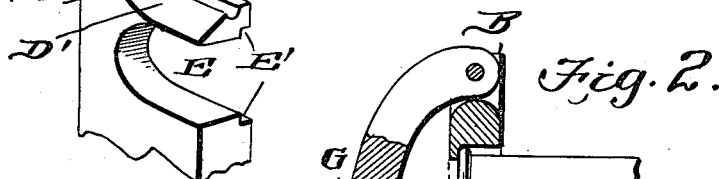
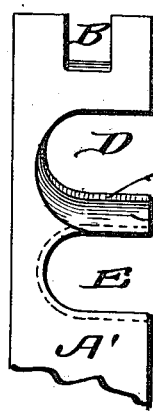
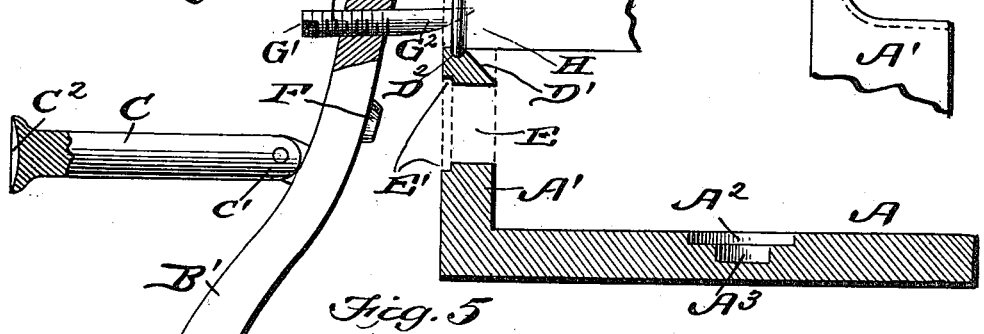
Inventor
John E. Krewson.
Witnesses No. 744,364. Patented November 17, 1903.

UNITED STATES PATENT OFFICE.

JOHN EDMOND KREWSON, OF ST. LOUIS, MISSOURI.

DEVICE FOR CAPPING, DECAPPING, AND LOADING CARTRIDGES.

SPECIFICATION forming part of Letters Patent No. 744,364, dated November 17, 1903.

Application filed February 28, 1903. Serial No. 145,552. (No model.)

*To all whom it may concern:*

Be it known that I, JOHN EDMOND KREWSON, a citizen of the United States, residing at St. Louis, in the State of Missouri, have invented a new and useful Device for Capping, Decapping, and Loading Cartridges, of which the following is a specification.

My invention is an improved combined capping, decapping, and shell-loading device designed to be used in connection with the usual brass-shell cartridge; and the object of the invention is to produce a device of this kind by means of which the cap of a shell that has been used can be easily and quickly removed, a new cap inserted in its place, and the shell reloaded, and also to provide a device which will enable the latter operation to be accomplished with a minimum amount of danger from accidental explosion.

In the accompanying drawings, Figure 1 is a perspective view showing the position of the various parts when a shell is being loaded. Fig. 2 is a longitudinal section, parts being in elevation, showing the position of the parts while decapping. Fig. 3 is a detail perspective view of the vertical member of the frame, the lower portion being broken away; and Fig. 4 is a face view of the vertical member. Fig. 5 is a detail view showing in elevation the decapping-screw in two positions.

In the construction of my improved device I employ a frame comprising the horizontal base member A and the integral vertical member $A'$, rising from one end of the member A. The upper face of the member A has a socket $A^2$ centrally formed therein, and the central portion of the bottom of this socket is cut out to form a circular recess $A^3$. The upper end of the member $A'$ is centrally cut out at B, and in this cut-out portion is pivotally secured the compound-curved handle $B'$, which is adapted to swing through an arc of approximately three-fourths of a circle. A lug $B^2$ is formed on what will be termed the "lower" side of the handle. A plunger C has perforated ears $C'$ at its upper end adapted to inclose the lug and by means of which the plunger is pivotally secured to the handle, and the lower end of the plunger is enlarged and concaved, as shown at $C^2$. This plunger is adapted to be suspended vertically above the socket $A^2$.

The vertical member $A'$ is laterally cut out or recessed at D and E, the portion D having a forwardly-inclined face $D'$ on its lower edge and a groove $D^2$ in the rear of said inclined face, the groove extending transversely with reference to the member $A'$ along the bottom of the portion D and is carried upwardly into the inner side wall of the cut-out portion. On the upper rear edge of the portion D is formed a depending flange $D^3$. The cut-out portion E has straight flat upper and lower walls cut away along their rear edges, whereby shoulders $E'$ are formed. It will be further noted that the rear wall of the groove $D^2$ is higher than the front wall of said groove.

On the upper side of the handle in the rear of the plunger is a truncated lug F, and slightly farther to the rear the handle is perforated obliquely, and in this perforation, which is threaded, works the threaded portion of the decapping-screw G, which is slotted at one end, as at $G'$, and tapers to a duck-bill point $G^2$ at the opposite end.

The operation of my device is as follows: The rim H of the cartridge or shell to be decapped is inserted in the groove $D^2$, the handle is turned into the position shown in Fig. 2, and the point of the decapper forced into the cap by turning the decapper by means of a screw-driver engaging the slot $G'$. By then drawing the handle to the rear the cap will be drawn out. A new cap is placed in position and the shell placed in the cut-out portion E, the rim engaging the shoulders $E'$, and by bearing down on the handle the lug F will force the new cap into position. The shell is then filled with powder and set upright in the socket $A^2$, the handle brought into the position shown in Fig. 1, and the plunger will pack the powder in the shell. The cap will rest during the packing operation over the recess $A^3$, thus preventing danger of explosion while packing the powder by removing all possible danger of the cap coming in contact with the base.

Having thus fully described my invention, what I claim as new, and desire to secure by Letters Patent, is—

1. A device of the kind described comprising a horizontal base member having a recessed socket on its upper surface, a vertical member rising from the base said vertical member having means for holding the rim of a cartridge, a handle pivoted to the vertical member, a plunger pivoted to the handle and adapted to aline with the recessed socket, a tapering, screw-threaded decapper adjustably mounted in the handle, and means carried by the handle and adapted to force a cartridge-cap into position, the said decapper and forcing means being adapted to aline with the cartridge-holding means of the vertical member.

2. A device of the kind described comprising a horizontal member having a socket formed in its upper face, and a central recess in said socket, an upright member having transverse upper and lower cut-out portions on one side, said cut-out portions being adapted to receive the rim of a cartridge, a handle pivoted to the upright member, a plunger pivoted thereto and adapted to be brought into alinement with the socket of the base, a removable, threaded, tapering decapper journaled in the handle and adapted to aline with the upper cut-out portion of the upright member, and a truncated lug on the handle adapted to be brought in alinement with the lower cut-out portion.

JOHN EDMOND KREWSON.

Witnesses:
D. SCHEER,
F. M. STEUTERMAN.